(12) United States Patent
Quellec et al.

(10) Patent No.: US 9,513,366 B2
(45) Date of Patent: Dec. 6, 2016

(54) METHOD FOR DETECTING, OVER SEVERAL ANTENNA REVOLUTIONS, SLOW-MOVING TARGETS BURIED IN THE RADAR CLUTTER, USING A MOBILE RADAR HAVING A ROTARY ANTENNA

(75) Inventors: Jean-Michel Quellec, Ploumoguer (FR); Stephane Kemkemian, Paris (FR); Xavier Mayeux, Lampaul-Plouarzel (FR)

(73) Assignee: Thales, Courbevoie (FR)

( * ) Notice: Subject to any disclaimer, the term of this patent is extended or adjusted under 35 U.S.C. 154(b) by 499 days.

(21) Appl. No.: 14/112,904

(22) PCT Filed: Apr. 5, 2012

(86) PCT No.: PCT/EP2012/056325
§ 371 (c)(1),
(2), (4) Date: Oct. 18, 2013

(87) PCT Pub. No.: WO2012/143251
PCT Pub. Date: Oct. 26, 2012

(65) Prior Publication Data
US 2014/0043185 A1    Feb. 13, 2014

(30) Foreign Application Priority Data

Apr. 21, 2011    (FR) ..................... 11 01256

(51) Int. Cl.
*G01S 7/292*    (2006.01)
*G01S 7/41*    (2006.01)
(Continued)

(52) U.S. Cl.
CPC .............. *G01S 7/414* (2013.01); *G01S 7/2926* (2013.01); *G01S 13/426* (2013.01); *G01S 13/50* (2013.01); *G01S 13/726* (2013.01); *G01S 7/24* (2013.01)

(58) Field of Classification Search
CPC ...... G01S 7/414; G01S 13/426; G01S 13/726; G01S 7/2923–7/2928; G01S 13/50; G01S 7/24
See application file for complete search history.

(56) References Cited

U.S. PATENT DOCUMENTS 4,833,475 A    5/1989   Pease et al.
5,867,121 A *  2/1999   Erickson ............... G01S 7/298
                                                342/185

(Continued)

FOREIGN PATENT DOCUMENTS

EP    1826585 A2    8/2007
GB    2435138 A     8/2007

*Primary Examiner* — Matthew M Barker
(74) *Attorney, Agent, or Firm* — Baker & Hostetler LLP

(57) ABSTRACT

A method for detecting targets using a mobile radar having a rotary antenna, notably small targets buried in radar clutter, without increasing the number of false detections, includes determining pre-detections during N antenna revolutions, including determining pre-detections revolution by revolution, each pre-detection being stored in a grid of cells centered on the position that the radar occupied at the start of the current revolution, each grid cell corresponding to an azimuth range and a distance range. This step also includes, at the end of each revolution, a step of shifting all the pre-detections stored in the grid during the previous revolutions by the movement undergone by the radar during the last revolution. The method also includes determining detections, a target being detected from the moment that a set of pre-detections stored in the grid has its distances to the radar which constitute a linear progression during the N antenna revolutions.

5 Claims, 5 Drawing Sheets

(51) Int. Cl.
  *G01S 13/42*   (2006.01)
  *G01S 13/50*   (2006.01)
  *G01S 13/72*   (2006.01)
  *G01S 7/24*    (2006.01)

(56) References Cited

U.S. PATENT DOCUMENTS

| | | | | |
|---|---|---|---|---|
| 6,522,289 | B1* | 2/2003 | Frerichs | G01S 7/24 342/175 |
| 7,489,267 | B2* | 2/2009 | Kojima | G01S 7/064 342/185 |
| 8,410,974 | B2* | 4/2013 | Kojima | G01S 7/066 342/147 |
| 2005/0264438 | A1 | 12/2005 | Fullerton et al. | |
| 2010/0156699 | A1* | 6/2010 | Kuoch | G01S 7/41 342/70 |
| 2011/0063163 | A1* | 3/2011 | Kojima | G01S 7/066 342/179 |

* cited by examiner

METHOD FOR DETECTING, OVER SEVERAL ANTENNA REVOLUTIONS, SLOW-MOVING TARGETS BURIED IN THE RADAR CLUTTER, USING A MOBILE RADAR HAVING A ROTARY ANTENNA

CROSS-REFERENCE TO RELATED APPLICATIONS

This application is a National Stage of International patent application PCT/EP2012/056325, filed on Apr. 5, 2012, which claims priority to foreign French patent application No. FR 1101256, filed on Apr. 21, 2011, the disclosures of which are incorporated by reference in their entirety.

FIELD OF THE INVENTION

The present invention relates to a method for detecting targets using a mobile radar having a rotary antenna. It applies more particularly to the field of naval or airborne radars seeking targets at sea.

Because of radar clutter, detecting small targets of low radar cross-section from mobile platforms, such as aircraft or ships for example, is attended by many difficulties. In fact, the scanning space for a rotary radar, though extending over 360° of azimuth, is limited in distance D. The instantaneous azimuthal field of the antenna being limited to the antenna lobe $\theta_0$, this lobe must be set into exploratory motion over 360° to cover the scanning space. During the exploration of the scanning field over 360° of azimuth and over a distance depth D, the radar establishes a state of detections in the form of a set of detection positions with respect to a reference position. A detection is characterized by the crossing of a predefined threshold, either manually by the operator, or by an automatic adaptive positioning device. But in the situation where the received level of a target is low in relation to the level of the numerous radar clutter pulses, commonly known as "spikes", reliable detection of this target over a single pass of the antenna is very difficult. In fact, if the threshold is set high to avoid detecting unwanted spikes, then the target is not detected. And if the threshold is set low, then the level of the target is buried among the many unwanted spikes. This is one of the technical problems that the present invention proposes to solve.

BACKGROUND

Techniques have been developed to attempt to overcome this difficulty, notably for radars on board a mobile platform and in the case where the positions of the detections of unwanted spikes are at least partly decorrelated over several successive antenna revolutions. These techniques consist in testing the stability of presumed detections in the scanning space. This involves determining pre-detection states over N successive antenna revolutions, then in shifting the positions of the pre-detections in a unique frame of reference for the N antenna revolutions (so that an immobile target is located at the same position in this unique frame of reference for the N antenna revolutions), and finally in testing, in this unique frame of reference, the confirmation of each pre-detection over the N antenna revolutions. One difficulty lies in the fact that, since the radar on principle performs its position measurements using azimuth and distance, the state of the pre-detections over one antenna revolution is obtained in a polar representation. At the next antenna revolution, the position of the radar carrier having been translated, it is not possible to directly superpose the pre-detections obtained in the polar frames of reference of the successive antenna revolutions. Another difficulty lies in the fact that the potential targets are mobile and that, even if the difficulty related to carrier movement is circumvented, the positions of the targets over several antenna revolutions cannot be directly superposed. Again, this is a problem that the present invention proposes to solve.

To attempt to overcome these difficulties, a known solution consists in integrating the pre-detections in Cartesian coordinates (X,Y) revolution by revolution. For each antenna revolution, the positions of the radar pre-detections, initially obtained in polar coordinates, are transferred into a planar Cartesian frame of reference whose origin is close to the position of the carrier. The shifts of the pre-detections obtained over the successive antenna revolutions are simply produced by a shift corresponding to the movement of the carrier in (X,Y) between the starts of the successive antenna revolutions. After shifting the pre-detections of the N last revolutions in the frame of reference (X,Y) of the last revolution, a detection test of K/N type is performed in each cell of the plane: this involves testing whether the number of pre-detections is greater than a number K over N antenna revolutions. A major drawback of this solution is that the elementary integration cell on the radar map is a square or a rectangle, and that the ratio between this cell and an elementary radar resolution cell is variable. In fact, an elementary radar resolution cell is defined by the aperture of the antenna lobe in azimuth and by the radar resolution in distance. The radar resolution is therefore notably variable as a function of distance. Therefore, detection performance is not uniform.

To attempt to overcome this drawback, another solution is based on the creation of N maps of pre-detections in polar coordinates $(\rho,\theta)$ with increments of azimuth $\theta$ and of distance $\rho$ which are compatible with possible movements of a target over the N revolutions used for detection. The pre-detections over the N maps are shifted in the reference frame of the plane corresponding to the current antenna revolution. A test is then carried out to verify whether, in each cell, the number of pre-detections is greater than a number K over N antenna revolutions. A major drawback of this solution is the large memory space necessary to store the maps of pre-detections over the N revolutions, as well as the computing power needed to shift the pre-detections obtained in a reference frame $(\rho,\theta)$ centered on the origin of each of the N revolutions in the reference frame of the current revolution. Another drawback of this solution is that, the size of the integration cell being large in relation to the elementary distance resolution of the radar, the movement of the target over the duration of the N revolutions often being large in relation to the dimensions of the target, and the only test applied to the pre-detections being a K/N test, the entry threshold for establishing the pre-detections must be high enough to limit false alarms at the processor output. This leads to a loss of sensitivity when detecting small targets in the radar clutter.

Patent application GB 2435 138 A describes a device for integrating pre-detections revolution by revolution. It is based on the use of two windows for the shift and test operations: a rectangular window surrounding the radar resolution cell and a window delimiting a distance bracket. This solution is a mixture of the previously described solutions involving integration in Cartesian coordinates and integration in polar coordinates, with which it shares the drawbacks mentioned previously.

SUMMARY OF THE INVENTION

The invention notably has the goal of enabling detection of small targets buried in numerous radar spikes with a limited false alarm rate, without requiring considerable processing power. To do this, the invention notably proposes to take into account the kinematic coherence of the pre-detections over successive antenna revolutions by application of the "track before detect" principle. But the present invention above all proposes a simple and effective implementation of this principle: the pre-detections obtained during the various antenna revolutions are arranged in a fixed storage grid having increments of azimuth and distance whose size is defined by the possible movements of the target. With this aim, the subject of the invention is a method for detecting targets using a mobile radar having a rotary antenna. The method contains a step of determining pre-detections during N antenna revolutions, where N is a strictly positive integer. This step includes, for an integer k varying from 1 to N, during the $k^{th}$ antenna revolution, a step of determining pre-detections, a pre-detection corresponding to a radar echo received from an azimuth and a distance beyond a given amplitude, each pre-detection being stored in a grid of cells centered on the position that the radar occupied at the start of the $k^{th}$ antenna revolution when the latter pointed to a reference azimuth, each pre-detection including its amplitude, its azimuth, its distance and the rank k, each cell of the grid corresponding to an azimuth range and a distance range. This step of determining pre-detections also includes, at the instant when the $k^{th}$ antenna revolution ends by pointing again to the reference azimuth, and after the grid has been re-centered on the position that the radar occupies at that instant, a step of shifting all the pre-detections stored in the grid during the preceding revolutions, the pre-detections being shifted by the movement undergone by the radar during the $k^{th}$ antenna revolution. The method also contains a step of determining detections, a target being detected from the moment that a set of pre-detections stored in the grid has its distances to the radar varying in a linear manner during the N antenna revolutions. The method makes it possible to detect small targets buried in the radar clutter without increasing the number of false detections.

Advantageously, the step of determining detections can include, if a grid cell contains a number of pre-detections above a given number, a step of grouping all the pre-detections stored in said cell with all the pre-detections stored in neighboring cells of said cell. The step of determining detections can also include, for cells resulting from the grouping step, a step of constructing a histogram of the gradients of distance to the radar as a function of rank k for all the pairs of pre-detections contained in the cells resulting from the grouping step. The step of determining detections can also include, if the histogram contains a peak corresponding to a number of pairs of pre-detections having a same gradient value above a given threshold, a step of linear regression over the distance to the radar as a function of rank k for all the pre-detections resulting from the grouping step, the cells for which the histogram maximum is below said given threshold not being retained for the linear regression step.

Again advantageously, the regression step can include a first step of linear regression over the distance to the radar as a function of rank k for all the pre-detections resulting from the grouping step, the pre-detections remote from the regression line beyond a given distance threshold being eliminated. The regression step may also include a second step of linear regression over the distance to the radar as a function of rank k for the pre-detections that have not been eliminated, a target being detected from the moment that the variance of the distance deviations from the regression line is below a given distance threshold.

For example, the precise location of a pre-detection may be stored in the grid in the form of an azimuth obtained by a center pip algorithm and of a distance sample number.

In an embodiment, the pre-detections may be stored in a memory whose addresses are defined by an index corresponding to an azimuth range and an index corresponding to a distance range.

For example, the reference azimuth may be the 0° azimuth.

The present invention also has as its main advantage the fact that the use of a fixed storage grid enables systematic processing and thereby avoids the difficulties of associating pips with tracks during the track before detect processing. Another advantage of the invention is that, since the pre-detections are stored in the grid with a distance measurement increment far finer than the grid, the shifting and track before detect calculations may be carried out with greater precision.

BRIEF DESCRIPTION OF THE DRAWINGS

Other features and advantages of the invention will become apparent with the help of the following description, made with reference to the appended drawings which show.

DETAILED DESCRIPTION

One principle of the invention is the use of a very low detection threshold. At the end of an antenna revolution, the pre-detections performed during this revolution, which include some true detections and a great many false alarms, are shifted in a reference frame centered on the position of the radar carrier at the start of the antenna revolution, then they are stored in a grid of cells covering the detection space with adapted steps of azimuth and distance. During several successive antenna revolutions, the pre-detections performed during one of these revolutions are shifted by the movements of the carrier in the polar reference frame of the current antenna revolution. The shifts are carried out iteratively, i.e. from antenna revolution to antenna revolution. The shifted positions are stored in the storage grid. The shift is carried out with a much finer increment than the increment of the storage grid. The precise distances of the pre-detections on the various "azimuth-distance" cells over the various antenna revolutions undergo cascade tests to verify at each step the linearity of the variation of the distance of the pre-detections over the various antenna revolutions. At each step, the pre-detections for which the distance variation is not linear are eliminated, which makes it possible to reduce the computing power.

The method according to the invention contains a step of determining pre-detections. The pre-detections correspond to the crossing of a threshold at a location in the current antenna revolution.

Figure 1:
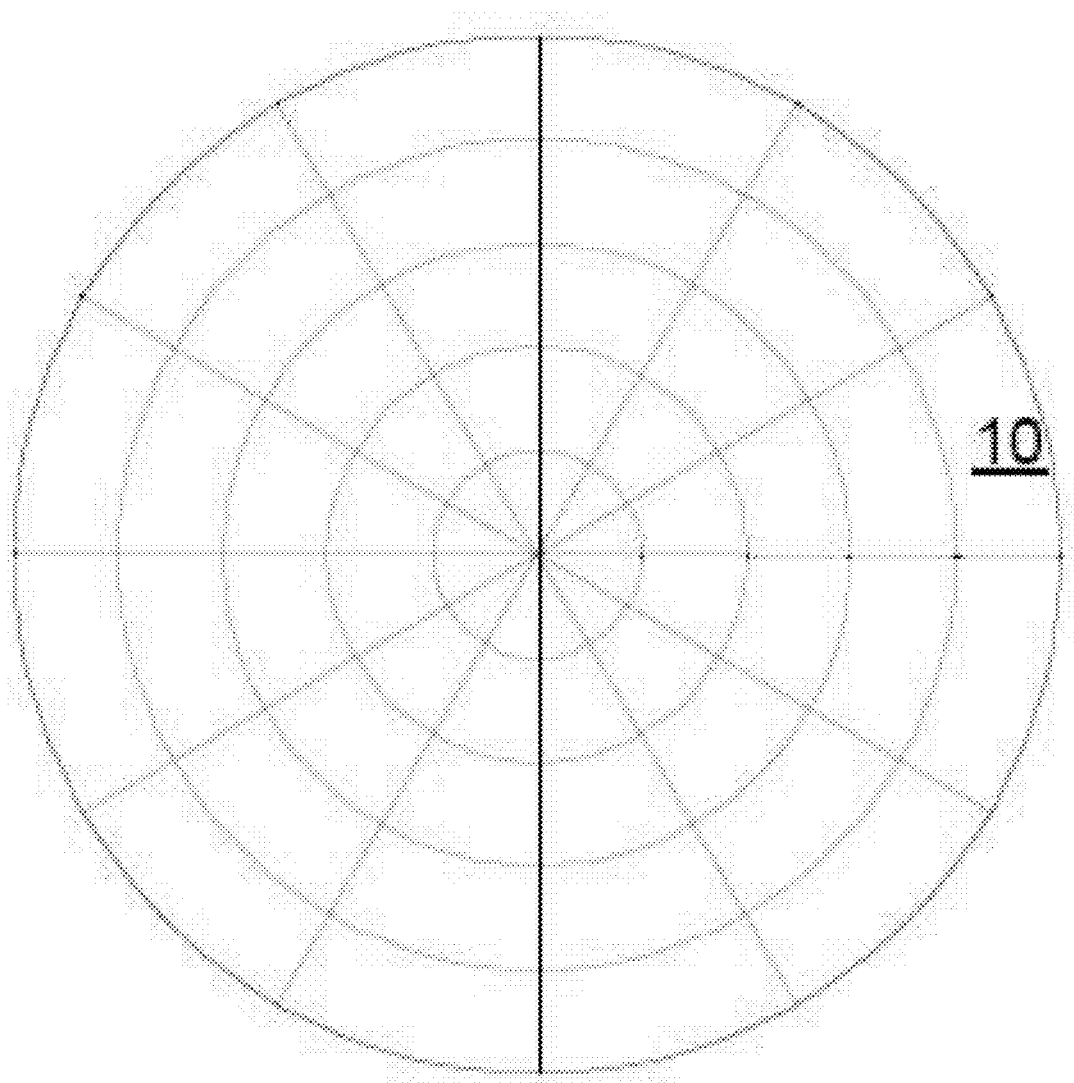
FIG. 1, an example of a grid of azimuth-distance cells to store pre-detections according to the invention.

As illustrated by FIG. 1, which illustrates an example of an azimuth-distance cell grid according to the invention, the pre-detections are determined in cells defined in polar coordinates, such coordinates being homogenous in radar measurements. The detection space covers 360° of azimuth, taking the North as origin of the azimuths, and the instrumented range of the radar in distance is partitioned in a systematic manner. The division of the detection field into azimuth-distance cells, such as cell 10 for example, is chosen according to the application so that once the compensation of the carrier path has been performed, the target does not leave the field. This division therefore depends on the potential velocity of the desired targets, on the distance of the cell in relation to the radar and on the integration time used, this time depending on the rate of rotation of the antenna and on the number of antenna revolutions used for the integration.

Figure 2:
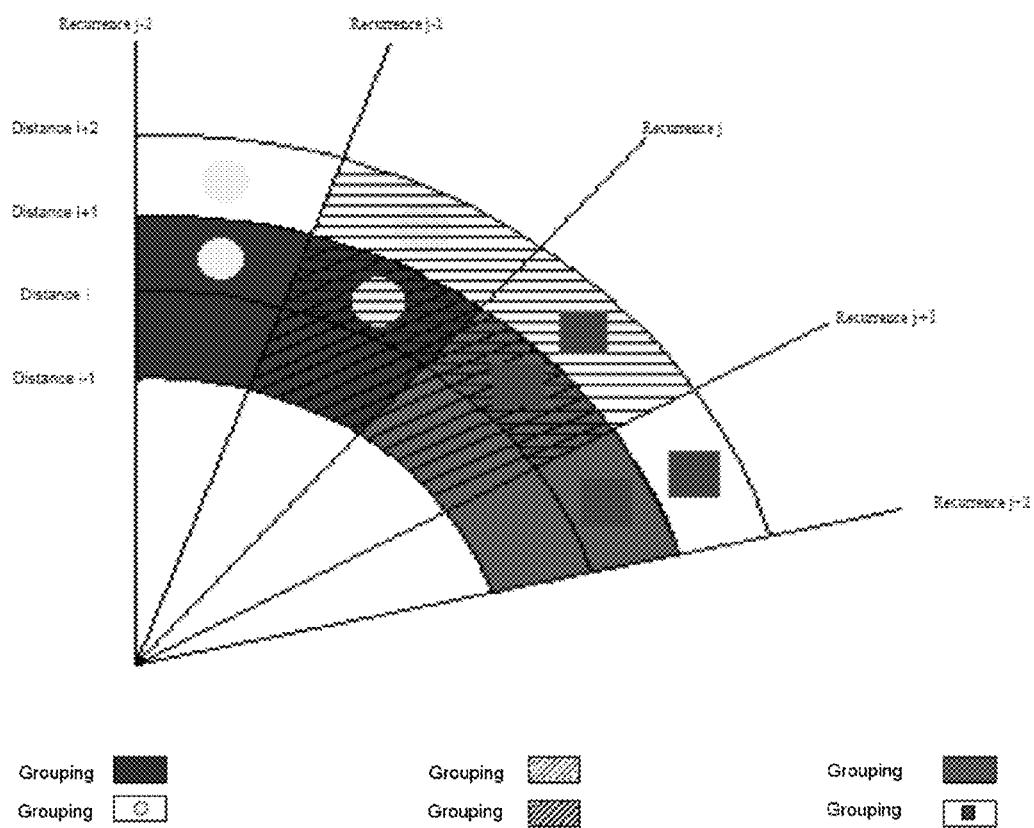
FIG. 2, an example of division into azimuth-distance cells and groupings of these cells according to the invention.

As illustrated by FIG. 2, which notably illustrates an example of division of the detection space into azimuth-distance cells according to the invention, to avoid cell-to-cell migration during the integration time, provision is made for the cells to overlap. Thus, in an embodiment of the invention, the field above a certain distance may be divided into cells making 2 increments of 0.9° in azimuth and 2 increments of 66 meters in distance.

The pre-detections are stored in a memory whose addresses are defined by an index j of azimuth recurrence and an index i of distance of the azimuth-distance cell in which the pre-detection has taken place. But the invention proposes to locate the pre-detections in a manner that is much finer in distance and in azimuth than the simple division into azimuth-distance cells. Precise distance location is carried out by storing in the memory the distance sample number in which the pre-detection was carried out. In modes of detection of small marine targets, the distance resolution is metric and the expanse in distance of the targets is much smaller than the expanse in distance of the integration azimuth-distance cell. Azimuth location may be performed by a center pip algorithm, which is known elsewhere, using the fact that when the antenna sweeps in front of the target, several radar pulses are received from the target, and that an azimuth is associated with each pulse by a specific device that is known elsewhere.

At the end of the pre-detection step, after each sweep of the radar in front of the target, and for each azimuth-distance cell, a certain number of pre-detections are stored at the memory address of the azimuth-distance cell. Each pre-detection is characterized by an amplitude, a precise distance and a precise azimuth. It should be noted that for a spread target, several pre-detections may be stored in the cell for this purpose. This does not affect the target detection capability. With this aim, provision is made for a grouping of detections at the processor output.

The method according to the invention also contains a step of shifting in the current antenna revolution the pre-detections carried out in the preceding pre-detection step, this in relation to the reference frame centered on the carrier during the passage of the antenna through the reference azimuth 0°. This shift uses the measured positions of pre-detections at time t and the information on carrier movement between the time $t_0$, corresponding to the passage of the antenna through the North, and to the reference antenna revolution $t_u$. The carrier movement information is obtained from a navigation center.

The method according to the invention also contains a step of shifting the pre-detections over the n antenna revolutions. This operation is performed taking into account the positions of the pre-detections carried out at the various antenna revolutions $S_0, S_1, \ldots, S_{n-1}$, corresponding to the origins of the reference frames $R_0, R_1, \ldots R_{n-1}$ and to the associated times $t_0, t_1, \ldots t_{n-1}$ and the translations of carrier positions between the various reference frames. So that subsequent signal processing operations over several revolutions may be carried out, the shifted positions of the pre-detections over the revolutions $S_0, S_1, \ldots, S_{n-1}$ must be retained over the n revolutions. For the n revolutions, these n positions shifted with respect to the origin of the revolution $S_{n-1}$ are retained in the memory of the cell of the revolution $S_{n-1}$ (even if the pre-detection, because of the movements of the carrier, was in another azimuth-distance cell in the preceding revolutions). This shifting operation over the n revolutions for each azimuth-distance cell is conducted in a sliding manner, i.e. during the revolution $S_n$, the pre-detections of the revolution $S_0$ are destroyed.

Advantageously, the shift calculations are carried out iteratively. The positions of the pre-detections shifted over the n last revolutions, for the revolution n, are shifted taking into account the vector of movement of the radar carrier ($R_{n-1}$ $R_n$). This makes it possible to simplify the shifting algorithms and to use shifting calculations using finite expansions because, in general, the movement is small in relation to the distance of the detections: this reduces the required computing power. In order to avoid cumulative truncation errors when performing carrier path shifting operations, the calculations must be performed in floating-point or with adequate computational power.

The method according to the invention also contains a step, for each azimuth-distance cell, of grouping the pre-detections over the neighboring cells. Advantageously, the grouping of cells makes it possible to detect targets that are found at the limit of a cell border and which cross this border during the N analysis antenna revolutions.

According to the division of the detection space carried out in the first step, this grouping step includes memorizing, for the revolution $S_n$, the positions of the pre-detections shifted by the movements of the carrier over the n last revolutions in a same memory space associated with the reference azimuth-distance cell and the neighbor cells in distance and azimuth. Referring to FIG. 2 for example, which also illustrates examples of azimuth-distance cell groupings according to the invention, the pre-detections over the n last revolutions for the 4 cells in red are stored in a memory space associated with the cell delimited by [(Distance i−1, Distance i); (Recurrence j−2, Recurrence j−1)]. At the end of this grouping step, the memory space associated with a grouping referenced to an azimuth-distance cell contains information on the various pre-detections in the cells grouped over the n last revolutions. The information stored in each memory space includes azimuth, distance and amplitude.

Figure 3:
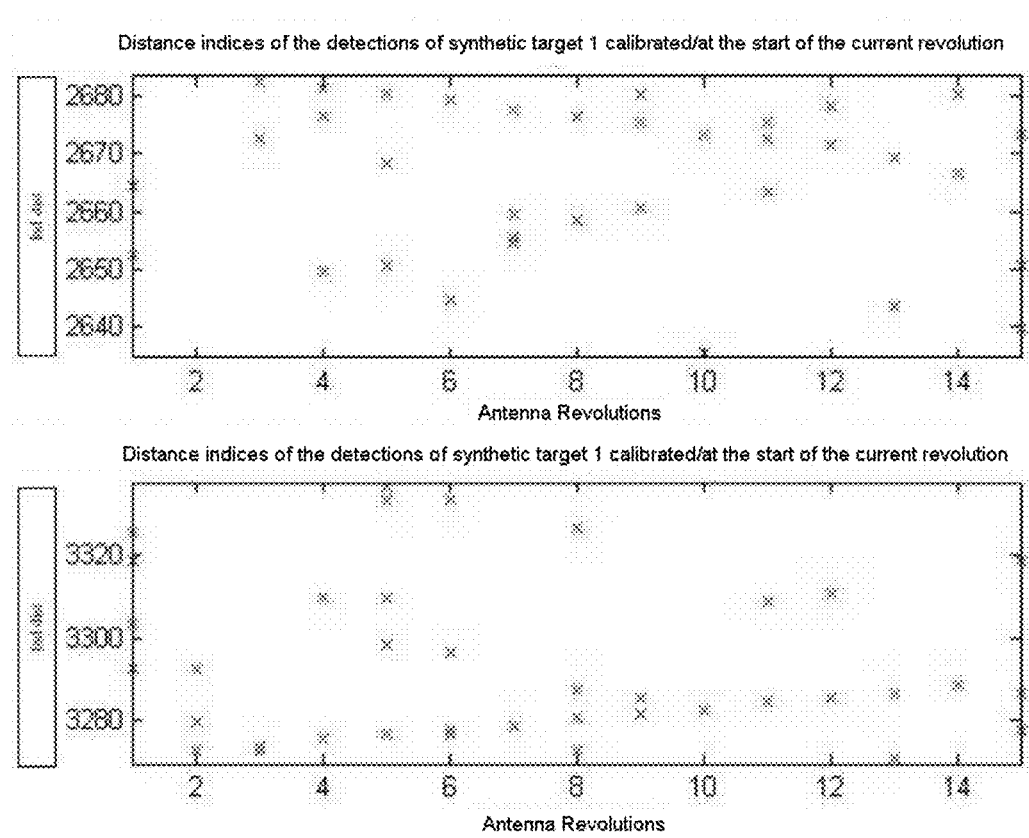
FIG. 3, examples of cases of detections based on pre-detections according to the invention.

As illustrated by the example in FIG. 3, which illustrates some examples of cases of detections based on pre-detections according to the invention, shown over 15 antenna revolutions, it is possible to graphically represent the distances of the various pre-detections that occur in a cell over the n last revolutions. In FIG. 3, the outlined pre-detections correspond to aligned directions. The others correspond to false alarms.

Figure 4:
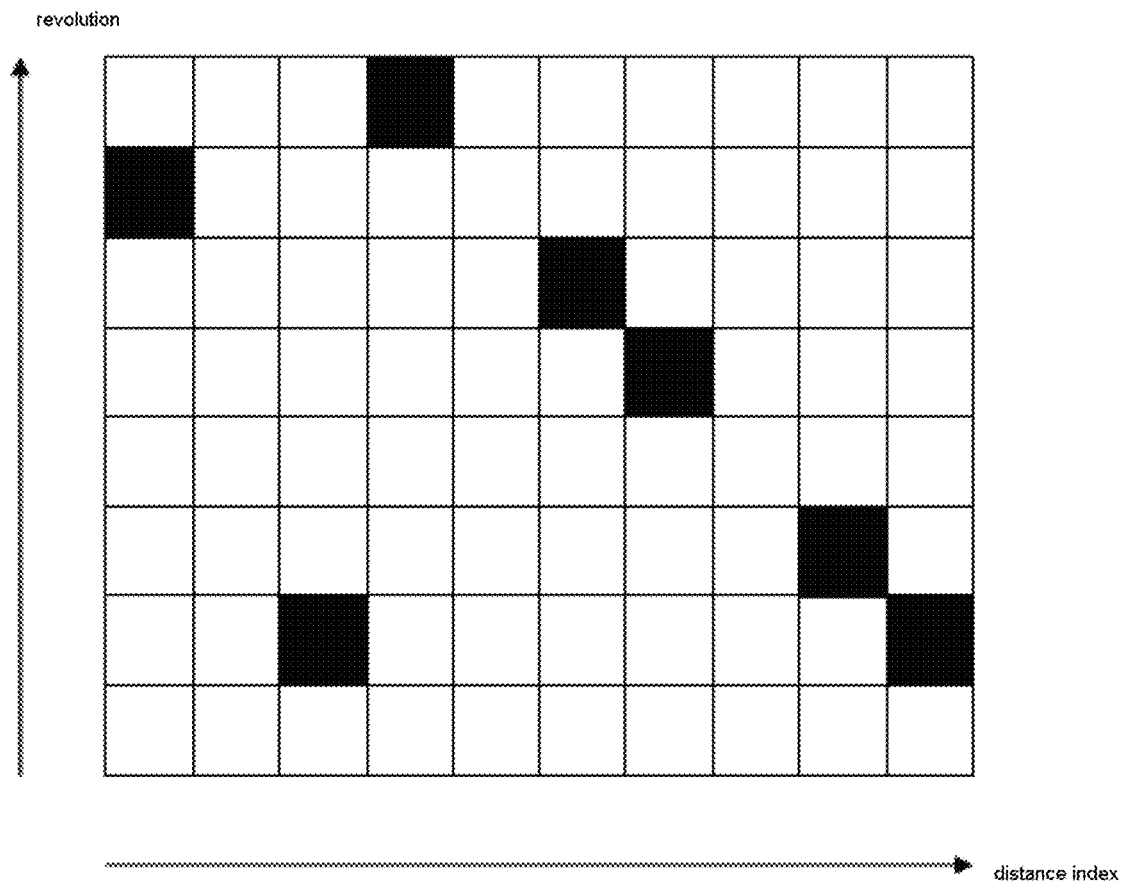
FIG. 4, an example of representation of pre-detections according to the invention.

The following steps make it possible to make use of the data regarding presence and precise distance over the n last revolutions, for each azimuth-distance cell of the detection space, such as those presented in the example table in FIG. 4, which illustrates an example of representation of pre-detections according to the invention, to define whether or not there is a detection in this cell. This notably involves verifying whether the distances are aligned. In fact, aligned distances correspond to detections of marine targets which, generally, move on rectilinear trajectories over a short time horizon. This is not the case for unwanted detections originating from reflections on the sea, commonly known as spikes. The invention notably proposes, in order to reduce the required computing power, to refrain from performing the test of linearity of evolution of the target's radial distance on all the azimuth-distance cells in the field. Thus, the final test of linearity is carried out only on cells for which a certain number of prior likelihood tests, requiring only a limited computing power, are passed. This makes it possible to apply the in-depth linearity test to just a limited number of azimuth-distance cells.

The method according to the invention also contains a step of reducing the number of candidate cells. This involves testing the number of pre-detections in the cell.

Figure 5:
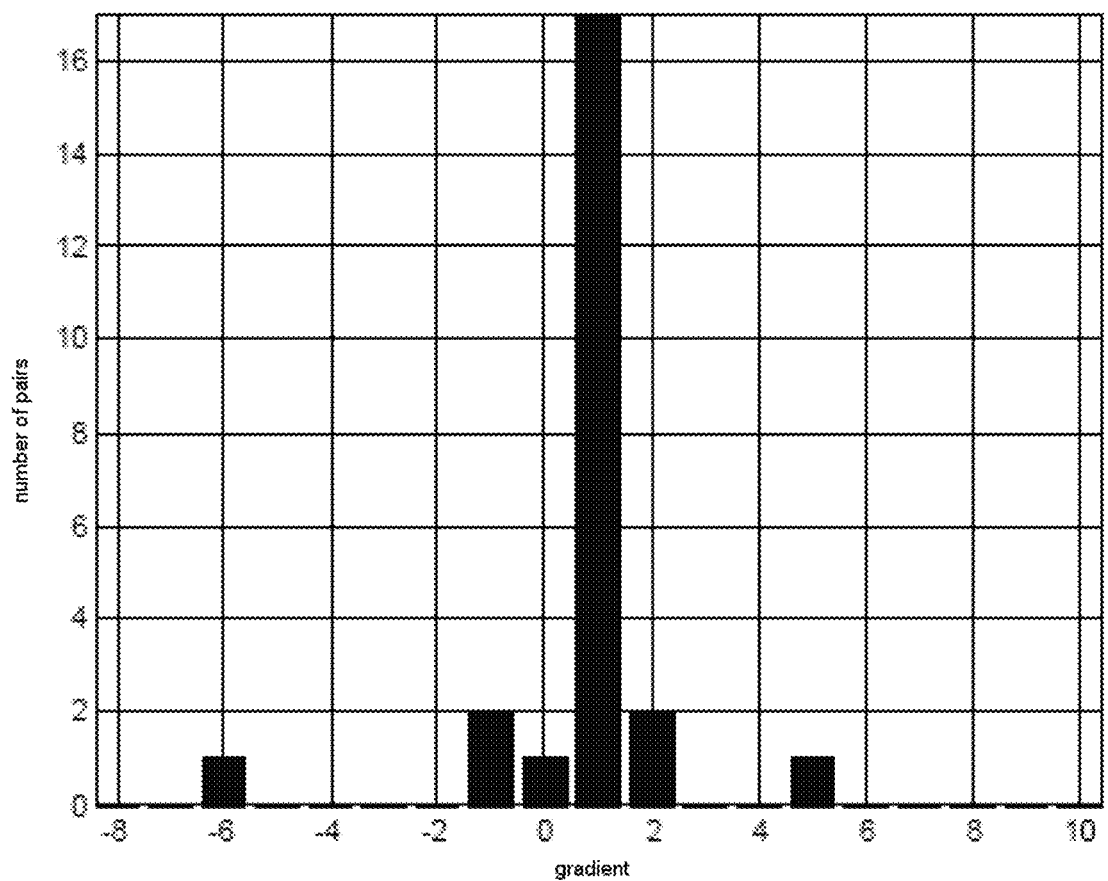
FIG. 5, an example of a histogram of gradients of the distance as a function of the antenna revolution rank according to the invention.

The method according to the invention also contains a step of constructing a histogram of gradients of distance as a function of antenna revolution rank, such as the example illustrated by FIG. 5, for each cell containing sufficient predictions. For example, the gradients are calculated over all the pairs of points of the table in FIG. 4 having distance sub-indices representing distance for x-coordinates, and ranks of revolutions for y-coordinates. The gradient for a pair of points is given by $p=\Delta x/\Delta y$. For the various pairs of points of the table in FIG. 4, a gradient may be calculated and a histogram of gradient values may be calculated as illustrated by FIG. 5. If the history of azimuth-distance cells contains an immobile target or a target having a linear trajectory over the integration time, then the histogram exhibits a peak, since the gradients between pre-detections reflect a constant radial velocity. Thus, a test is carried out to compare a maximum of the histogram with a threshold. Only the cells for which the histogram maximum exceeds the threshold are retained for the next steps.

It should be noted that variants of this step of constructing a histogram may reduce the computing power needed. This can for example involve constructing the histogram in several sub-steps, by making the histogram of gradients and applying the associated test only to the maximum over a history of M revolutions with M<N, the test over the history of N revolutions then being carried out only on cells having passed the test over the history of M revolutions. This variant makes it possible to reduce the computing power by applying the complete test over N revolutions (which is the most expensive in terms of computing time) to only a limited number of cells in the radar map.

The method according to the invention also contains a linear regression step.

Initially, a first linear regression is carried out on the table of (x,y) positions of the pre-detections of the graph in FIG. 3, only for the azimuth-distance cells having passed the test of the histogram maximum. Pre-detections too remote from the regression line are eliminated from the table, because they may be considered as aberrant points.

Next, a second linear regression is carried out on this same table after elimination of the overly remote pre-detections. A threshold is applied to the variance in the position deviations in relation to the regression line. If this variance is below the threshold, it is decided that the time variation of the pre-detection distance over the different antenna revolutions is linear and that the detection is validated for this azimuth-distance cell.

Finally, the method according to the invention also contains a step of aggregating the detections. In fact, given the principle of systematic division of the detection space into azimuth-distance cells according to the first step, a target can, at the conclusion of the various steps described previously, create a validated detection on neighbor cells. There are then two possibilities.

Either the processing output is only for a visualization intended for an operator. Then the detections may be presented without additional processing. The operator thus sees more or less expansive detections according to the detected targets.

Or the processing output is used by another process, such as a tracking function for example. Then the position of the detection may be refined by carrying out a calculation of the barycenter of the contiguous detections The invention previously described has the main advantage of not requiring considerable processor power, either in terms of memory or computing resources. This is notably because the conventional steps of Kalman filtering are replaced here by simple tests of kinematic coherence, such as simplified "track before detect" tests adapted to target trajectory durations over the short duration of the initialization of the detection, these tests being moreover carried out on the elements of the fixed grid. It is also because a simple test makes it possible to obtain a good indication regarding the fact that the distance of the pre-detection does indeed vary linearly over the time horizon of the successive antenna revolutions, and thus to deduce that there is a strong presumption of presence of a target in a cell of the grid, and not radar clutter.

Moreover, the invention described previously also has the advantage that, thanks to the iterative shifting of the pre-detections over several antenna revolutions in relation to the carrier movement, it is properly adapted to detection by a radar mounted on a naval or airborne platform.

The invention claimed is:

1. A method for detecting targets using a mobile radar having a rotary antenna, comprising:
    rotating the rotary antenna;
    determining pre-detections with the mobile radar during N antenna revolutions of the rotary antenna, where N is a positive integer, including, for an integer k varying from 1 to N:
        during a $k^{th}$ antenna revolution of the rotary antenna, determining pre-detections with the mobile radar, a pre-detection corresponding to a radar echo received from an azimuth and a distance beyond a given amplitude, each pre-detection being stored in a memory with a grid of cells centered on a position that the radar occupied at a start of the $k^{th}$ antenna revolution when the latter pointed to a reference azimuth, each pre-detection including its amplitude, its azimuth, its distance and a rank k, each cell of the grid corresponding to an azimuth range and a distance range;
        re-centering the grid on a position that the radar occupies; and
        at an instant when the $k^{th}$ antenna revolution ends by pointing again to the reference azimuth, and after the grid has been re-centered, shifting all the pre-detections stored in the grid during preceding revolutions, the pre-detections being shifted by movement undergone by the radar during the $k^{th}$ antenna revolution; and
    determining detections with the mobile radar, a target being detected from a moment that a set of pre-detections stored in the grid has its distances to the radar varying in a linear manner during the N antenna revolutions, wherein determining detections with the mobile radar comprises detecting targets buried in radar clutter.

2. The method as claimed in claim 1, wherein determining detections includes:

if a grid cell contains a number of pre-detections above a given number, grouping all the pre-detections stored in said cell with all the pre-detections stored in neighboring cells of said cell, for cells resulting from grouping, constructing a histogram of gradients of distance to the radar as a function of rank k for all pairs of pre-detections contained in the cells resulting from grouping; and if the histogram contains a peak corresponding to a number of pairs of pre-detections having a same gradient value above a given threshold, performing linear regression over the distance to the radar as a function of rank k for all the pre-detections resulting from grouping, the cells for which a histogram maximum is below said given threshold not being retained for the linear regression.

3. The method as claimed in claim 2, wherein performing the linear regression includes:

performing linear regression over the distance to the radar as a function of rank k for all the pre-detections originating from grouping, the pre-detections remote from the regression line beyond a given distance threshold being eliminated; and performing linear regression over the distance to the radar as a function of rank k for the pre-detections that have not been eliminated, a target being detected from the moment that a variance of distance deviations from the regression line is below a given distance threshold.

4. The method as claimed in claim 1, wherein a precise location of a pre-detection is stored in the grid in a form of an azimuth obtained by an algorithm and of a distance sample number.

5. The method as claimed in claim 1, wherein the reference azimuth is the 0° azimuth.

* * * * *